(12) United States Patent
Narita

(10) Patent No.: US 11,851,544 B2
(45) Date of Patent: Dec. 26, 2023

(54) POROUS WATER-SOLUBLE NONIONIC CELLULOSE ETHER HAVING EXCELLENT SOLUBILITY AND METHOD FOR PRODUCING THE SAME

(71) Applicant: SHIN-ETSU CHEMICAL CO., LTD., Chiyoda-ku (JP)

(72) Inventor: Mitsuo Narita, Joetsu (JP)

(73) Assignee: SHIN-ETSU CHEMICAL CO., LTD.

( * ) Notice: Subject to any disclaimer, the term of this patent is extended or adjusted under 35 U.S.C. 154(b) by 19 days.

(21) Appl. No.: 16/983,465

(22) Filed: Aug. 3, 2020

(65) Prior Publication Data

US 2020/0362132 A1   Nov. 19, 2020

Related U.S. Application Data

(62) Division of application No. 15/333,616, filed on Oct. 25, 2016, now Pat. No. 10,767,023.

(30) Foreign Application Priority Data

Oct. 27, 2015 (JP) .................. 2015-211073

(51) Int. Cl.
*C08B 11/20* (2006.01)
*C08J 9/24* (2006.01)
(Continued)

(52) U.S. Cl.
CPC .............. *C08J 9/24* (2013.01); *C08B 11/08* (2013.01); *C08B 11/20* (2013.01); *C08L 1/284* (2013.01);
(Continued)

(58) Field of Classification Search
CPC ...... C08J 2205/044; Y10T 428/249978; C08B 11/20
See application file for complete search history.

(56) References Cited

U.S. PATENT DOCUMENTS 3,823,133 A * 7/1974 Hurst et al. ........... C08B 11/145
536/43
10,767,023 B2 * 9/2020 Narita .................... C08B 11/20
(Continued)

OTHER PUBLICATIONS

Doelker, Swelling Behavior of Water-Soluble Cellulose Derivatives, Studies in Polymer Science, vol. 8, 1990, pp. 125-145 ; https://doi.org/10.1016/B978-0-444-88654-5.50011-X (Year: 1990).*
(Continued)

*Primary Examiner* — Hoa (Holly) Le
(74) *Attorney, Agent, or Firm* — Williams Mullen; F. Michael Sajovec

(57) ABSTRACT

There are provided a porous water-soluble nonionic cellulose ether having an average pore size of 36 μm or smaller and an average particle size of from 30 to 300 μm; and a method for continuously producing said cellulose ether comprising the steps of: pulverizing a first water-soluble nonionic cellulose ether to obtain a first pulverized product, and sieving the pulverized product through a sieve having an opening of from 40 to 400 μm to obtain a first residue-on-sieve and a first sieve-passing fraction, wherein a portion or all of the first residue-on-sieve containing particles having particle sizes smaller than and greater than the opening of the sieve is re-pulverized together with a second water-soluble nonionic cellulose ether in the step of pulverizing to obtain a second pulverized product, which is pulverized to obtain the cellulose ether as a second sieve-passing fraction containing the re-pulverized particles.

3 Claims, 1 Drawing Sheet

(51) Int. Cl.
  *C08B 11/08* (2006.01)
  *C08L 1/28* (2006.01)
  *B07B 1/00* (2006.01)
  *B02C 4/00* (2006.01)
(52) U.S. Cl.
  CPC .................................... *B02C 4/00* (2013.01); *B07B 1/00* (2013.01); *C08J 2301/26* (2013.01)

(56) References Cited

U.S. PATENT DOCUMENTS

| | | | | |
|---|---|---|---|---|
| 2001/0025101 A1* | 9/2001 | Schlesiger | ............. | C08B 11/20 536/30 |
| 2007/0093656 A1* | 4/2007 | Kim | ........................ | C08B 11/00 536/95 |
| 2009/0022791 A1* | 1/2009 | Obae | ................... | A61K 9/2059 424/464 |
| 2009/0165972 A1* | 7/2009 | Narita | ....................... | C08B 1/10 162/90 |
| 2013/0005945 A1* | 1/2013 | Yue | ........................... | C08L 1/14 530/331 |
| 2014/0018531 A1* | 1/2014 | Goerlach-Doht | ....... | C08B 11/20 536/91 |

OTHER PUBLICATIONS

Harita et al., Basic Concepts Of Cellulose Polymers—A Comprehensive Review, Archives of Pharmacy Practice, vol. 3, Issue 3, 2012 (Year: 2012).*

Cherop et al., Effect of Non-Ionic Cellulose Ethers on Properties of White Portland Cement, International Journal of Applied Engineering Research ISSN 0973-4562 vol. 12, No. 10 (2017) pp. 2502-2508 (Year: 2017).*

* cited by examiner

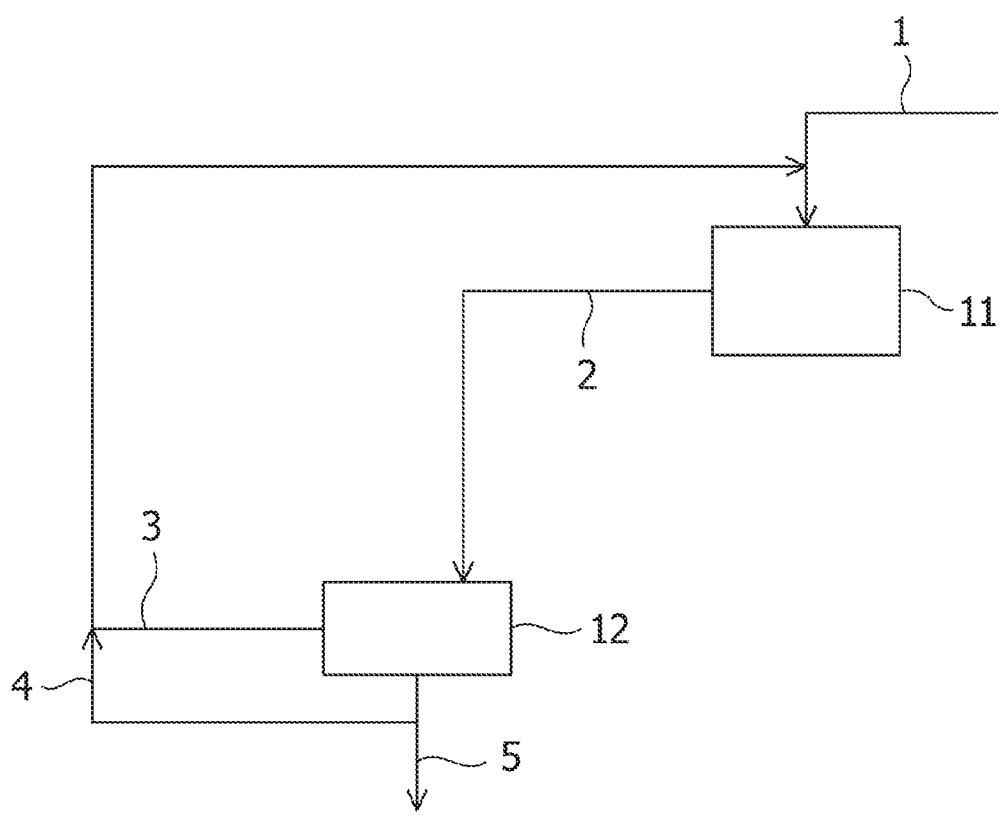

POROUS WATER-SOLUBLE NONIONIC CELLULOSE ETHER HAVING EXCELLENT SOLUBILITY AND METHOD FOR PRODUCING THE SAME

RELATED APPLICATION

The present application is a divisional of U.S. application Ser. No. 15/333,616, filed Oct. 25, 2016, which claims priority to Japanese Patent Application No. 2015-211073, filed Oct. 27, 2015, the disclosures of which are incorporated by reference in their entireties.

BACKGROUND OF THE INVENTION

1. Field of the Invention

The present invention relates to a porous water-soluble nonionic cellulose ether having excellent solubility and being used in chemical fields, pharmaceutical fields and the like; and a method for producing the porous water-soluble nonionic cellulose ether.

2. Description of the Related Art

A water-soluble nonionic cellulose ether has been used as a pharmaceutical product, a food binder, a disintegrant, a thickening agent of various solvents, a water retention agent for building materials, a binder for extrusion, a suspension stabilizer, and the like.

A water-soluble nonionic cellulose ether is often required to be kneaded with a small amount of water to dissolve therein. When it is kneaded with a small amount of water and dissolved therein, a surface portion of water-soluble nonionic cellulose ether powder or grains dissolved first in water sometimes forms a highly tacky film during dissolution. This highly tacky film allows the water-soluble polymer powder or grains to adhere to each other by stirring during dissolution to form large particles in lump form. In this case, it takes long hours to dissolve them in water because of uneven distribution of water. For this reason, dissolution of water-soluble polymer such as methyl cellulose, hydroxypropyl methyl cellulose and hydroxyethyl methyl cellulose is carried out by a complicated method such as a method comprising the steps of: dispersing such a cellulose ether in hot water in advance by taking advantage of the property that the cellulose ether is insoluble in hot water of 90° C. or more, and then cooling the resulting dispersion gradually. On the other hand, dissolution of water-soluble polymer such as polyethylene oxide and sodium polyacrylate is carried out by a complicated method such as a method comprising the steps of: dispersing the polymer in water in a particularly high-speed stirring apparatus, while preventing formation of lumps, and then converting the resulting dispersion to a solution by stirring.

As a method for producing a water-soluble nonionic cellulose ether which can be dissolved without formation of lumps in cold water, there is proposed a method comprising the steps of: adding 0.01 to 15 parts by weight of at least one plasticizer selected from ether-, ester-, and amine-based plasticizers to the water-soluble nonionic cellulose ether powder, and after uniform mixing and drying, pulverizing the resulting mixture into coarse particles (Japanese Patent Application Examined Publication No. 48-006622/1973). There is also proposed a method capable of producing spherical granules close to true spheres with few fibrous granules at an almost constant grain size, comprising the steps of: granulation with a specified granulator and drying the resulting granules (Japanese Patent Application Unexamined Publication No. 6-166026/1994).

On the other hand, there is proposed a method comprising the steps of: dispersing a water-soluble nonionic cellulose ether powder while allowing a cross-linking agent such as a dialdehyde to act on the surface of the powder so as to prevent formation of lumps even in cold water, and then destroying the crosslinked structure by the addition of an alkali component to accelerate its solubility (Japanese Patent Application Examined Publication No. 42-006674/1967). Further, there is proposed a method of producing a water-soluble nonionic cellulose ether which is free of dusting, has excellent water wettability and is soluble in cold water in a short period of time without forming lumps, comprising the steps of: adding a crosslinking agent, an acid, and a humectant to a water-soluble nonionic cellulose ether to obtain a particulate material of which 30% by weight or less passes through a 30-mesh sieve and of which 30% by weight or less remains on a 200-mesh sieve (Japanese Patent Application Unexamined Publication No. 2000-063565).

SUMMARY OF THE INVENTION

In the method of Japanese Patent Application Examined Publication No. 48-006622/1973, the particles are once densified in the steps of mixing and drying, but become coarse particles having a fibrous portion, or fine powders or granules having a fiber on the surface thereof again in the step of pulverizing, which will form lumps in cold water. In order to improve such a defect, a large amount of water is added in the step of mixing with the plasticizer to increase a loose apparent density, and the resulting mixture is dried and pulverized. However, there is accompanied with the drawback that the apparent density of the resulting granules becomes too high so that it takes time to dissolve them. In the method of Japanese Patent Application Unexamined Publication No. 6-166026/1994, the produced spherical granules sometimes have the drawback that it takes time to dissolve the granules in water because the water does not penetrate into the granules owing to poor wettability of the water-soluble cellulose ether.

In the methods of Japanese Patent Application Examined Publication No. 42-006674/1967 and Japanese Patent Application Unexamined Publication No. 2000-063565, a dialdehyde or the like having mutagenicity is used so that the methods may have problems of environmental hygiene. Further, addition of a crosslinking agent, for example, an expensive silicon compound such as an alkylalkoxysilane including tetramethoxysilane, methyltrimethoxysilane and dimethyldimethoxysilane, sometimes deteriorates compatibility so that the methods are not suited for the production of water-soluble nonionic cellulose ethers to be used for cosmetics or suspension polymerization agents.

In consideration of the above-described situations, the present invention has been made. An object of the invention is to provide a porous water-soluble nonionic cellulose ether having an improved dissolution rate in a small amount of water; and a production method thereof.

The present inventors have carried out an extensive investigation with a view to achieving the above-described object. As a result, the present inventors have found that a porous water-soluble nonionic cellulose ether having an average pore size of 36 μm or smaller and an average particle size of from 30 to 300 μm is excellent in dissolution rate in a small amount of water, leading to completion of the invention.

In one aspect of the invention, there is provided a porous water-soluble nonionic cellulose ether having an average pore size of 36 μm or smaller and an average particle size of from 30 to 300 μm. In another aspect of the invention, there is provided a method for continuously producing a porous water-soluble nonionic cellulose ether having an average pore size of 36 μm or smaller and an average particle size of from 30 to 300 μm, comprising the steps of: pulverizing a first water-soluble nonionic cellulose ether to obtain a first pulverized product, and sieving the first pulverized product through a sieve having an opening of from 40 to 400 μm to obtain a first residue-on-sieve and a first sieve-passing fraction, wherein a portion or all of the first residue-on-sieve containing particles having particle sizes smaller than and greater than the opening of the sieve is re-pulverized together with a second water-soluble nonionic cellulose ether in the step of pulverizing to obtain a second pulverized product, which is sieved to obtain the porous water-soluble nonionic cellulose ether as a second sieve-passing fraction containing the re-pulverized particles; and wherein each of the first and second residues-on-sieve contains 10% by weight or more of particles having particle sizes smaller than the opening of the sieve. In a further aspect of the invention, there is provided a method for continuously producing a porous water-soluble nonionic cellulose ether having an average pore size of 36 μm or smaller and an average particle size of from 30 to 300 μm, comprising the steps of: pulverizing a first water-soluble nonionic cellulose ether to obtain a first pulverized product, and sieving the first pulverized product through a sieve having an opening of from 40 to 400 μm to obtain a first residue-on-sieve and a first sieve-passing fraction, wherein a portion or all of the first residue-on-sieve containing particles having particle sizes smaller than and greater than the opening of the sieve, and a portion of the first sieve-passing fraction, are re-pulverized together with a second water-soluble nonionic cellulose ether in the step of pulverizing to obtain a second pulverized product, which is sieved to obtain the porous water-soluble nonionic cellulose ether as a second sieve-passing fraction containing the re-pulverized particles.

According to the invention, there can be provided a porous water-soluble nonionic cellulose ether having an improved dissolution rate in a small amount of water.

BRIEF DESCRIPTION OF THE DRAWING

FIG. 1 shows an example of the sieving step according to the invention.

DETAILED DESCRIPTION OF THE PREFERRED EMBODIMENTS

Examples of the porous water-soluble nonionic cellulose ether include alkyl celluloses, hydroxyalkyl celluloses and hydroxyalkyl alkyl celluloses. Examples of the alkyl celluloses include methyl cellulose having a DS value of from 1.0 to 2.2 and ethyl cellulose having a DS value of from 2.0 to 2.6. Examples of the hydroxyalkyl celluloses include hydroxyethyl cellulose having an MS value of from 0.05 to 3.0 and hydroxypropyl cellulose having an MS value of from 0.05 to 3.3. Examples of the hydroxyalkyl alkyl celluloses include hydroxyethyl methyl cellulose having a DS value of from 1.0 to 2.2 and an MS value of from 0.1 to 0.6, hydroxypropyl methyl cellulose having a DS value of from 1.0 to 2.2 and an MS value of from 0.1 to 0.6, and hydroxyethyl ethyl cellulose having a DS value of from 1.0 to 2.2 and an MS value of from 0.1 to 0.6. The DS represents a degree of substitution and is the number of alkoxy groups present per glucose ring unit of cellulose; and the MS represents a molar substitution and is an average molar number of hydroxyalkoxy groups added per glucose ring unit of cellulose. These DS and MS can be calculated from values measured based on Japanese Pharmacopoeia 16th Edition.

The porous water-soluble nonionic cellulose ether has an average pore size of 36 μm or smaller, more preferably 33 μm or smaller, more preferably 30 μm or smaller, from the standpoint of uniform distribution of water and promotion of dissolution of the water-soluble nonionic cellulose ether. When the porous water-soluble nonionic cellulose ether has an average pore size greater than 36 μm, it cannot have an excellent dissolution rate in a small amount of water. The lower limit of the average pore size is preferably 20 μm for keeping the polymerization degree. The term "average pore size" means a median diameter in cumulative pore volume distribution when pores are measured while regarding each shape of the pores as a cylinder and it includes pores on the surfaces of the particles and voids between the particles. The average pore size can be measured by using, as a measuring and analyzing apparatus, a mercury intrusion porosimeter (for example, "AutoPore 9520", product of Shimadzu Corporation) and subjecting about 0.05 g of a sample in a standard cell to measurement under the initial mercury pressure of 7 kPa.

A water-soluble nonionic cellulose ether having an average pore size of 36 μm or smaller has not conventionally been available because it is irrational to return a portion of a pulverized product containing particles having particle sizes smaller than the opening of a sieve used in a sieving step to the pulverization step for re-pulverization in view of preferential achievement of efficient pulverization, improved productivity and sharp particle size distribution. According to the invention, for the first time, it becomes possible to provide a water-soluble nonionic cellulose ether having an average pore size of 36 μm or smaller by returning a portion or all of a pulverized product containing particles having particle sizes smaller than the opening of a sieve used in a sieving step to a pulverization step for re-pulverization.

The porous water-soluble nonionic cellulose ether has an average particle size of from 30 to 300 μm, preferably from 30 to 150 μm, more preferably from 30 to 100 μm, still more preferably from 30 to 70 μm, particularly preferably from 30 to 65 μm. When the porous water-soluble nonionic cellulose ether has an average particle size smaller than 30 μm, an excellent dissolution rate in a small amount of water may not be obtained, and aggregation among porous water-soluble nonionic cellulose ether particles hinders the dissolution. When the porous water-soluble nonionic cellulose ether has an average particle size greater than 300 μm, an excellent dissolution rate in a small amount of water cannot be obtained. The average particle size can be measured by using a laser diffraction particle size analyzer (for example, "HELOS&RODOS", product of Sympatec GmbH) and selecting a measurement concentration of 2% by weight, measurement time of 2 seconds and a shape factor of 1.0.

The porous water-soluble nonionic cellulose ether contains, based on the total weight, preferably 5% by weight or more, more preferably 6% by weight or more, still more preferably 7% by weight or more of particles having particle sizes smaller than 15 μm; preferably 2% by weight or more, more preferably 3% by weight or more of particles having particle sizes smaller than 10 μm; and preferably 1% by weight or more, more preferably 2% by weight or more of particles having particle sizes smaller than 5 μm from the standpoint of achieving an excellent dissolution rate in a small amount of water. The particle size distribution can be allowed to fall within the above-described ranges by controlling a returning amount of the pulverized product, which contains particles having particle sizes smaller than the opening of the sieve used in the sieving step, to the pulverization step for re-pulverization.

A loose apparent density of the porous water-soluble nonionic cellulose ether is preferably from 0.20 to 0.50 g/ml, more preferably from 0.22 to 0.38 g/ml from the standpoint of achieving an excellent dissolution rate in a small amount of water. The term "loose apparent density" means a bulk density in a loosely packed state and it can be measured by a method comprising the steps of: uniformly feeding a sample into a cylindrical stainless container having a diameter of 5.03 cm and a height of 5.03 cm (volume: 100 ml) from 23 cm above the container through a JIS 22-mesh sieve having opening of 710 μm; leveling the upper surface of the cylindrical container; and weighing the container having the upper surface leveled.

The viscosity at 20° C. of a 2% by weight aqueous solution of the porous water-soluble nonionic cellulose ether is preferably from 100 to 600,000 mPa·s, more preferably from 3,000 to 300,000 mPa·s, still more preferably from 5,000 to 200,000 mPa·s from the standpoint of shape retention or solubility. The viscosity at 20° C. of a 2% by weight aqueous solution of the porous water-soluble nonionic cellulose ether can be measured using Brookfield type viscometer LV, which is a single cylinder-type rotational viscometer, in accordance with Viscosity Measurement Method II of hypromellose in Japanese Pharmacopoeia 16th Edition.

The dissolution time of the porous water-soluble nonionic cellulose ether can be made shorter by preferably 10% or more, more preferably 20% or more than that of a conventional product. More specifically, it is preferably 160 seconds or less, more preferably 140 seconds or less, still more preferably 120 seconds or less. The dissolution time means a time at which a torque value becomes constant after 1 kg of a water-soluble nonionic cellulose ether is introduced in a 5-L sigma double-arm kneader equipped with a torque meter and then 1.5 kg of water of 20° C. is introduced therein at once while mixing them at 60 rpm.

The porous water-soluble nonionic cellulose ether shows an excellent dissolution property even in a small amount of water. For example, when the water-soluble nonionic cellulose ether is dissolved in water by using a proper kneading apparatus such as a kneader or a roll mill, a weight ratio of the water to the water-soluble nonionic cellulose ether is preferably from 0.6 to 99, more preferably from 1 to 20.

Since the porous water-soluble nonionic cellulose ether has an excellent dissolution property even in a small amount of water, it is usable as a drug or food binder, a disintegrant, a thickening agent for various types of solvents, a water retention agent for building materials, or a binder for extrusion molding.

Next, the method for continuously producing a porous water-soluble nonionic cellulose ether will be described.

A water-soluble nonionic cellulose ether can be produced using the conventional method, for example, the following method.

First, in an etherification step for reacting an alkali cellulose with an etherifying agent, a reaction product (i.e. crude cellulose ether) can be obtained. The alkali cellulose can be obtained by bringing a solution of an alkali metal hydroxide such as sodium hydroxide into contact with a pulp such as wood pulp or linter pulp.

Preparation of an alkali cellulose and reaction thereof with an etherifying agent may be carried out simultaneously in the presence of both the solution of an alkali metal hydroxide and the etherifying agent. Alternatively, the alkali cellulose may be prepared and then reacted with the etherifying agent. Examples of the etherifying agent include alkyl halides such as methyl chloride, ethylene oxide and propylene oxide.

The reaction product (i.e. crude cellulose ether) obtained in the etherification step is then subjected to a washing step typically comprising a washing stage and a filtering stage and/or pressing stage, so that a water-soluble nonionic cellulose ether is obtained.

The resulting water-soluble nonionic cellulose ether is then typically subjected to drying and pulverization steps to provide a water-soluble nonionic cellulose ether as a final product. Drying may be carried out simultaneously with pulverization, or drying may be followed by pulverization.

A known pulverizer can be used. Examples of the pulverizer include an impact mill, an oscillating mill, a ball mill, a roller mil, and a turbo mill.

After the pulverization step, a pulverized product taken out from the pulverizer is allowed to pass through a sieve to obtain a residue-on-sieve and a sieve passing fraction. The sieve-passing fraction is collected as a product. Thus, a water-soluble nonionic cellulose ether powder is obtained. The sieve has an opening of preferably from 40 to 400 μm, more preferably from 100 to 350 μm.

When the sieve has an opening of 40 μm or greater but smaller than 100 μm, the porous water-soluble nonionic cellulose ether has an average particle size of preferably from 30 to 39 μm. When the sieve has an opening of 100 μm or greater but smaller than 300 μm, the porous water-soluble nonionic cellulose ether has an average particle size of preferably from 40 to 100 μm. When the sieve has an opening of from 300 to 400 μm, the porous water-soluble nonionic cellulose ether has an average particle size of preferably from 100 to 300 μm.

A feed rate of the pulverized product per sieve area is variable depending on a sieve area, intensity of oscillation or tapping of the sieve, pulverization ability of the pulverizer, a feed rate of a new raw material to the pulverizer and the like. The feed rate of the pulverized product per sieve area is preferably from 0.2 to 20 ton/m$^2$/hour, more preferably from 0.5 to 10 ton/m$^2$/hour when the pulverizer is under steady operation. When the feed rate is below 0.2 ton/m$^2$/hour, a porous water-soluble nonionic cellulose ether may not be obtained even when a portion of the pulverized product is returned to the pulverizer. When the feed rate is more than 20 ton/m$^2$/hour, excessively large equipment may be required. More specifically, when the sieve has an opening of 40 μm or greater but smaller than 100 μm, a feed rate of the pulverized product per sieve area is preferably from 0.2 to 0.5 ton/m$^2$/hour; when the sieve has an opening of 100 μm or greater but smaller than 300 μm, a feed rate of the pulverized product per sieve area is preferably from 0.2 to 1.0 ton/m$^2$/hour; and when the sieve has an opening of from 300 to 400 μm, a feed rate of the pulverized product per sieve area is preferably from 0.5 to 1.0 ton/m$^2$/hour.

After sieving, a portion or all of the residue-on-sieve is mixed with a water-soluble cellulose ether which will be pulverized in the pulverization step to obtain a pulverization mixture.

A portion or all of the residue-on-sieve is required to contain both particles having particle sizes smaller than the opening of the sieve and particles having particle sizes greater than the opening of the sieve. The lower limit of the content of the particles having particle sizes smaller than the opening of the sieve in the residue-on-sieve is preferably 10% by weight or more, more preferably 20% by weight or more, still more preferably 50% by weight or more. The upper limit of the content of the particles having particle sizes smaller than the opening of the sieve in the residue-on-sieve is preferably 90% or less, more preferably 80% or less, still more preferably 70% or less. When the content is more than 90%, the through-put of the pulverization may drastically decrease and the productivity may be deteriorated.

As the particles having particle sizes smaller than the opening of the sieve, a portion of the sieve-passing fraction may be mixed with a portion or all of the residue-on-sieve. A proportion of the residue-on-sieve in the pulverized product to be returned to the pulverizer for re-pulverization can be controlled by adjusting the feed rate of the pulverized product per sieve area. As the feed rate of the pulverized product per sieve area increases, there is an increase in a proportion of particles which have particle sizes smaller than the opening of the sieve in the pulverized product, and which have not passed through the sieve, and which will be returned to the pulverizer. The proportion of particles having particle sizes smaller than the opening of the sieve in the pulverized product to be returned to the pulverizer can be adjusted by changing the total sieve area of a plurality of sieves with increase or decrease in the number of sieves to be used; or by reducing the contact area of powder to the sieve with a portion of the sieve sealed or with a dam installed.

The proportion of particles having particle sizes smaller than the opening of the sieve in the pulverized product to be returned to the pulverizer can be measured using a method comprising the steps of sufficiently tapping a sieve having an opening equal to that of the above-described sieve and having the pulverized product thereon; and measuring the weight of particles which have passed through the sieve. The sieve to be used for the measurement has an inner diameter of from 75 to 300 mm, the amount of the powder is from 20 to 100 g, and tapping time is one minute or more, preferably from 5 to 40 minutes.

An amount of the pulverized product, which contains a portion or all of the residue-on-sieve and an optional portion of sieve-passing fraction and will be re-pulverized together with the un-pulverized water-soluble nonionic cellulose ether, is preferably from 0.2 to 6 times, more preferably from 1.0 to 4.5 times, on dry weight basis, of the whole amount of the un-pulverized water-soluble nonionic cellulose ether to be pulverized together by the pulverizer in the pulverization step.

An example of the method for continuously producing a porous water-soluble nonionic cellulose ether having an excellent dissolution property even in a small amount of water will next be described referring to FIG. 1.

A water-soluble nonionic cellulose ether 1 is pulverized using a pulverizer 11. The pulverizer may be an apparatus which simultaneously pulverizes and dries a hydrous water-soluble nonionic cellulose ether after washing, or may be an apparatus which pulverizes a water-soluble nonionic cellulose ether dried after washing. The pulverized product 2 thus obtained is sieved with a sieve 12 having an opening of from 40 to 400 μm to obtain a residue-on-sieve containing 10% by weight or more of particles having particle sizes smaller than the opening, as well as a sieve-passing fraction. Then, a portion or all 3 of the residue-on-sieve is mixed with a water-soluble nonionic cellulose ether to be pulverized in the pulverizer 11 and then re-pulverized. The sieve-passing fraction is introduced into a product tank as a water-soluble nonionic cellulose ether 5 as a non-porous product.

The sieve-passing fraction is divided into two portions by installation of a damper in a pipe or a conveyor in which or on which the sieve-passing fraction moves. One portion, water-soluble nonionic cellulose ether 5, is introduced into a product tank as a product, while the other portion, a sieve-passing portion 4, is optionally returned to the pulverizer 11 for re-pulverization together with the residue-on-sieve 3. In this case, the amount to be returned to the pulverizer can be controlled by adjusting the angle of the damper or the like. The amount to be returned to the pulverizer can also be controlled by alternately switching the damper to a product tank side or a return side by setting a timer to change a division ratio. The division ratio can be adjusted so that the weight content of particles having particle sizes smaller than the opening of the sieve in the pulverized product to be returned to the pulverizer falls within a preferable range.

EXAMPLES

The invention will hereinafter be explained specifically by Examples and Comparative Examples. It should not be construed that the invention is limited to or by Examples.

The physical properties of porous or non-porous water-soluble cellulose ethers obtained in Examples and Comparative Examples were measured using the following method.

<Method of Measuring the Content of Particles Having Particle Sizes Smaller than an Opening of a Sieve in a Pulverized Product>

A pulverized product (50 g) was placed on a sieve having an inner diameter of 200 mm and having an opening equal to that of a sieve provided at an outlet of a pulverizer, and was subjected to tapping for 20 minutes. A weight of particles having passed through the sieve was measured.

<Average Pore Size>

The 0.05 g of a water-soluble cellulose was placed in a standard cell and an average pore size was measured at an initial mercury pressure of 7 kPa using a mercury intrusion porosimeter ("Autopore 9520", product of Shimadzu Corporation).

<Average Particle Size>

An average particle size was measured by using a laser diffraction particle size distribution analyzer ("HELOS&RODOS", product of Sympatec GmbH) and selecting a measurement concentration of 2% by weight, measurement time of 2 seconds, and a shape factor of 1.0.

<Particle Size Distribution>

A sieving method was used.

<Loose Apparent Density>

A loose apparent density was measured in a method comprising the steps of: feeding a sample uniformly into a cylindrical stainless vessel having a diameter of 5.03 cm and a height of 5.03 cm (volume: 100 ml) from 23 cm above the vessel through a JIS 22-mesh sieve having opening of 710 μm; leveling the upper surface; and weighing the vessel having the upper surface leveled.

<Viscosity at 20° C. of a 2% by Weight Aqueous Solution>

The viscosity was measured using Brookfield type viscometer LV, which was a single cylinder-type rotational viscometer, in accordance with Viscosity Measurement Method II of hypromellose in Japanese Pharmacopoeia 16th Edition.

<Measurement of Dissolution Time>

Dissolution time was measured in a method comprising the steps of introducing 1 kg of a water-soluble cellulose ether in a 5-L sigma double-arm kneader equipped with a torque meter; adding 1.5 kg of water of 20° C. into the kneader at once while mixing at 60 rpm; monitoring a time-dependent change of torque by a torque meter; and measuring time at which a torque became constant after gradual increase. The time required to make a torque constant was regarded as the dissolution time of the water-soluble cellulose ether.

Example 1

In a pressure vessel equipped with an internal stirrer, 1.98 parts by weight of 49% by weight sodium hydroxide, 1.60 parts by weight of methyl chloride for methoxy substitution, and 0.21 part by weight of propylene oxide for hydroxy-propoxy substitution were added to 1.00 part by weight of a wood pulp. The resulting mixture was allowed to react at a temperature of from 60 to 90° C. for 2 hours to obtain a crude product. Hot water of 95° C. in an amount of 20 times of the weight of the hydroxypropyl methyl cellulose was then added therein to disperse the crude product and the resulting dispersion was filtered to obtain a washed cake. Hot water of 95° C. in an amount of 10 times of the weight of hydroxypropyl methyl cellulose was added to the washed cake and the resulting mixture was filtered to obtain a washed cake having a water content of 50% by weight. After the water content of the washed cake was increased to 65% by weight in addition of water, the washing cake was dried to obtain fibrous hydroxypropyl methyl cellulose having residual salt content of 1% by weight and water content of 1.2% by weight. The fibrous hydroxypropyl methyl cellulose thus obtained had a DS value of 1.8 and an MS value of 0.15 (Table 1).

The fibrous hydroxypropyl methyl cellulose was continuously fed to a ball mill at a rate of 150 kg/hour. The ball mill had, at the outlet hereof, a sieve having an opening of 250 μm and a sieve area of 1 $m^2$, through which the milled product discharged from the ball mill was sieved at a feed rate of the milled product to the sieve of 0.5 ton/$m^2$/hour.

All of the residue-on-sieve, which was the milled product containing 40% by weight of particles having particle sizes smaller than the opening of the sieve and 60% by weight of particles having particle sizes equal to or greater than the opening of the sieve, was returned to the inlet of the ball mill at a rate of 350 kg/hour and was re-milled together with un-milled hydroxypropyl methyl cellulose. The weight of the milled product to be returned to the milling step was 2.3 times (350/150) of the weight of the un-milled hydroxypropyl methyl cellulose.

The product having passed through the sieve was collected in a product tank at a rate of 150 kg/hour as porous hydroxypropyl methyl cellulose. The physical properties of the porous hydroxypropyl methyl cellulose thus obtained were measured using the above-described methods. As a result, the average pore size was 30 μm; the average particle size was 60 μm; with respect to the particle size distribution, the content of particles smaller than 15 μm was 6% by weight, the content of particles smaller than 10 μm was 2% by weight, and the content of particles smaller than 5 μm was 1% by weight; and the loose apparent density was 0.25 g/ml. The viscosity at 20° C. of a 2% by weight aqueous solution was 4,000 mPa·s and the dissolution time was 120 seconds (Table 2).

Example 2

In the same manner as in Example 1 except that the wood pulp was replaced by a cotton linter pulp and 1.30 parts by weight of 49% by weight sodium hydroxide, 1.13 parts by weight of methyl chloride and 0.27 part by weight of propylene oxide were used with respect to 1.00 part by weight of the cotton linter pulp, the reaction, washing containing a washing stage and a filtering stage, and drying were carried out to obtain fibrous hydroxypropyl methyl cellulose having a DS value of 1.5 and an MS value of 0.20 (Table 1).

The fibrous hydroxypropyl methyl cellulose was continuously fed to a roller mill at a rate of 150 kg/hour. The roller mill had, at the outlet hereof, the same sieve as in Example 1, through which the milled product discharged from the roller mill was sieved at a feed rate of the milled product to the sieve of 0.3 ton/$m^2$/hour. The product having passed through the sieve was collected in a product tank at a rate of 150 kg/hour.

A portion of the residue-on-sieve, which was the milled product containing 30% by weight of particles having particle sizes smaller than the opening of the sieve and 70% by weight of particles having particle sizes equal to or greater than the opening of the sieve, was returned to the inlet of the roller mill at a rate of 150 kg/hour and was re-milled together with un-milled hydroxypropyl methyl cellulose. The weight of the milled product to be returned to the milling step was 1.0 time (150/150) of the weight of the un-milled hydroxypropyl methyl cellulose.

The physical properties of the porous hydroxypropyl methyl cellulose thus obtained were measured in the same manner as in Example 1. The results are shown in Table 2.

Example 3

In the same manner as in Example 1 except that 2.83 parts by weight of 49% by weight sodium hydroxide, 2.13 parts by weight of methyl chloride and 0.53 part by weight of propylene oxide were used with respect to 1.00 part by weight of the same pulp as in Example 1, the reaction and washing containing a washing stage and a filtering stage were carried out. After the washing, water was added to a washed cake to increase the water content thereof to 65% by weight to obtain hydrous hydroxypropyl methyl cellulose having a DS value of 1.90 and an MS value of 0.25 (Table 1).

The hydrous hydroxypropyl methyl cellulose was fed to an impact mill at a rate of 150 kg/hour on dry weight basis. Hot air was sent to the impact mill at the same time, so that milling and drying were carried out simultaneously. The impact mill had, at the outlet hereof, the same sieve as in Example 1, through which the milled product discharged from the impact mill was sieved at a feed rate of the milled product to the sieve of 0.2 ton/$m^2$/hour. The product having passed through the sieve was collected in a product tank at a rate of 150 kg/hour.

A portion of the residue-on-sieve, which was the milled product containing 20% by weight of particles having particle sizes smaller than the opening of the sieve and 80% by weight of particles having particle sizes equal to or greater than the opening of the sieve, was returned to the inlet of the impact mill at a rate of 50 kg/hour and was re-milled together with un-milled hydroxypropyl methyl cellulose. The weight of the milled product to be returned to the milling step was 0.3 time (50/150) of the weight of the un-milled hydroxypropyl methyl cellulose.

The physical properties of the porous hydroxypropyl methyl cellulose thus obtained were measured in the same manner as in Example 1. The results are shown in Table 2.

Example 4

In the same manner as in Example 1 except that 2.83 parts by weight of 49% by weight sodium hydroxide and 2.13 parts by weight of methyl chloride for methoxy substitution were added to 1.00 part by weight of the same pulp as in Example 1, the reaction, washing containing a washing stage and a filtering stage, and subsequent drying were carried out to obtain fibrous methyl cellulose having a DS value of 1.8 (Table 1).

The fibrous methyl cellulose was continuously fed to a turbo mill at a rate of 150 kg/hour. The turbo mill had, at the outlet hereof, the same sieve as in Example 1, through which the milled product discharged from the turbo mill was sieved at a feed rate of the milled product to the sieve of 0.6 ton/m$^2$/hour. The 80% by weight of the product having passed through the sieve was collected in a product tank at a rate of 150 kg/hour.

The remaining 20% by weight portion of the product having passed through the sieve and the residue-on-sieve were returned to the inlet of the turbo mill at a rate of 37.5 kg/hour and 412.5 kg/hour, respectively. Eventually, a portion of the milled product containing 50% by weight of sum of the particles of the residue-on-sieve having particle sizes smaller than the opening of the sieve and the particles having passed through the sieve and 50% by weight of the particles of the residue-on-sieve having particle sizes equal to or greater than the opening of the sieve was re-milled together with an un-milled hydroxypropyl methyl cellulose. The weight of the milled product to be returned to the milling step was 3.0 times (450/150) of the weight of the un-milled hydroxypropyl methyl cellulose.

The physical properties of the porous methyl cellulose thus obtained were measured in the same manner as in Example 1. The results are shown in Table 2.

Example 5

In the same manner as in Example 4 except for use of a wood pulp having a polymerization degree higher than that of the wood pulp used in Example 4, the reaction, washing containing a washing stage and a filtering stage, and subsequent drying were carried out to obtain fibrous methyl cellulose having a DS value of 1.8 (Table 1).

The fibrous methyl cellulose was continuously fed to a roller mill at a rate of 150 kg/hour. The roller mill had, at the outlet hereof, the same sieve as in Example 1, through which the milled product discharged from the roller mill was sieved at a feed rate of the milled product to the sieve of 0.7 ton/m$^2$/hour. The product having passed through the sieve was collected in a product tank at a rate of 150 kg/hour.

All of the residue-on-sieve, which was the milled product containing 50% by weight of particles having particle sizes smaller than the opening of the sieve and 50% by weight of particles having particle sizes equal to or greater than the opening of the sieve, was returned to the inlet of the roller mill at a rate of 550 kg/hour and was re-milled together with un-milled hydroxypropyl methyl cellulose. The amount of the milled product to be returned to the milling step was 3.7 times (550/150) of the amount of the un-milled methyl cellulose.

The physical properties of the methyl cellulose thus obtained were measured in the same manner as in Example 4. The results are shown in Table 2.

Example 6

In the same manner as in Example 1 except that the wood pulp was replaced by a cotton linter pulp and 1.30 parts by weight of 49% by weight sodium hydroxide, 1.13 parts by weight of methyl chloride and 0.27 part by weight of propylene oxide were used with respect to 1.00 part by weight of the cotton linter pulp, the reaction, washing containing a washing stage and a filtering stage, and subsequent drying were carried out to obtain fibrous hydroxypropyl methyl cellulose having a DS value of 1.5 and an MS value of 0.20 (Table 1).

The fibrous hydroxypropyl methyl cellulose was continuously fed to a turbo mill at a rate of 150 kg/hour. The turbo mill had, at the outlet hereof, the same sieve as in Example 1, through which the milled product discharged from the turbo mill was sieved at a feed rate of the milled product to the sieve of 0.8 ton/m$^2$/hour. The product having passed through the sieve was collected in a product tank at a rate of 150 kg/hour.

All of the residue-on-sieve, which was the milled product containing 55% by weight of particles having particle sizes smaller than the opening of the sieve and 45% by weight of particles having particle sizes equal to or greater than the opening of the sieve was returned to the inlet of the turbo mill at a rate of 650 kg/hour and was re-milled together with un-milled hydroxypropyl methyl cellulose. The weight of the milled product to be returned to the milling step was 4.3 times (650/150) of the weight of the un-milled hydroxypropyl methyl cellulose.

The physical properties of the hydroxypropyl methyl cellulose thus obtained were measured in the same manner as in Example 1. The results are shown in Table 2.

Example 7

In the same manner as in Example 1 except that the wood pulp was replaced by a cotton linter pulp and 1.98 parts by weight of 49% by weight sodium hydroxide, 1.60 parts by weight of methyl chloride and 0.21 part by weight of propylene oxide were used with respect to 1.00 part by weight of the cotton linter pulp, the reaction and washing containing a washing stage and a filtering stage were carried out. After the washing, water was added to a washed cake to increase the water content thereof to 65% by weight to obtain hydrous hydroxypropyl methyl cellulose having a DS value of 1.8 and an MS value of 0.15 (Table 1).

The hydrous hydroxypropyl methyl cellulose was fed to an impact mill at a rate of 150 kg/hour on dry weight basis. Hot air was sent to the impact mill at the same time so that milling and drying were carried out simultaneously. The impact mill had, at the outlet hereof, a sieve having an opening of 63 μm and a sieve area of 1.0 m$^2$, through which the milled product discharged from the impact mill was sieved at a feed rate of the milled product to the sieve of 0.4 ton/m$^2$/hour. The product having passed through the sieve was collected in a product tank at a rate of 150 kg/hour.

All of the residue-on-sieve, which was the milled product containing 55% by weight of particles having particle sizes smaller than the opening of the sieve and 45% by weight of particles having particle sizes equal to or greater than the opening of the sieve, was returned to the inlet of the impact mill at a rate of 250 kg/hour and re-milled together with un-milled hydroxypropyl methyl cellulose. The weight of the milled product to be returned to the milling step was 1.7 times (250/150) of the weight of the un-milled hydroxypropyl methyl cellulose.

The physical properties of the hydroxypropyl methyl cellulose thus obtained were measured in the same manner as in Example 1. The results are shown in Table 2.

Example 8

In the same manner as in Example 7, hydrous hydroxypropyl methyl cellulose having a DS value of 1.8 and an MS value of 0.15 and having water content of 65% by weight was obtained (Table 1).

The hydrous hydroxypropyl methyl cellulose was fed to an impact mill at a rate of 50 kg/hour on dry weight basis. Hot air was sent to the impact mill at the same time so that milling and drying were carried out simultaneously. The impact mill had, at the outlet hereof, a sieve having an opening of 63 μm and a sieve area of 1.0 m$^2$, through which the milled product discharged from the impact mill was sieved at a feed rate of 0.095 ton/m$^2$/hour. The 90% by weight of the product having passed through the sieve was collected in a product tank at a rate of 45 kg/hour.

The remaining 10% by weight of the product having passed through the sieve and the residue-on-sieve were returned to the inlet of the impact mill at a rate of 5 kg/hour and 45 kg/hour, respectively. Eventually, a portion of the milled product containing 20% by weight in sum of the particles of the residue-on-sieve having particle sizes smaller than the opening of the sieve and the particles having passed through the sieve and 80% by weight of the particles of the residue-on-sieve having particle sizes equal to or greater than the opening of the sieve was returned to the inlet of the impact mill at a rate of 50 kg/hour and was re-milled together with un-milled hydroxypropyl methyl cellulose. The weight of the milled product to be returned to the milling step was 1.0 time (50/50) of the weight of the un-milled hydroxypropyl methyl cellulose.

The physical properties of the hydroxypropyl methyl cellulose thus obtained were measured in the same manner as in Example 1. The results are shown in Table 2.

Comparative Example 1

In the same manner as in Example 7, hydrous hydroxypropyl methyl cellulose having a DS value of 1.8 and an MS value of 0.15 and having water content of 65% by weight was obtained (Table 1).

The hydrous hydroxypropyl methyl cellulose was fed to an impact mill at a rate of 80 kg/hour on dry mass basis. Hot air was sent to the impact mill at the same time so that milling and drying were carried out simultaneously. The impact mill had, at the outlet thereof, the same sieve as in Example 8 and the milled product was sieved under the same conditions as in Example 8. The product having passed through the sieve was collected in a product tank at a rate of 80 kg/hour.

The milled product not having passed through the sieve was returned to the inlet of the impact mill at a rate of 10 kg/hour, without being mixed with the milled product having passed through the sieve, and was re-milled. The weight of the milled product to be returned to the milling step was 0.13 time (10/80) of the weight of an un-milled hydroxypropyl methyl cellulose.

The physical properties of the resulting hydroxypropyl methyl cellulose were measured in the same manner as in Example 1. The results are shown in Table 2.

TABLE 1

| | pulverization conditions | | | | water-soluble nonionic cellulose ether | |
|---|---|---|---|---|---|---|
| | | feed rate of pulverized product to sieve {t/(m$^2$/hour)} | re-pulverization | | substitution groups | |
| | pulverizer | | pulverized product to be re-pulverized | *1 (wt %) | methoxy (DS) | hydroxy-propoxy (MS) |
| Example 1 | ball mill | 0.5 | residue-on-sieve | 40 | 1.8 | 0.15 |
| Example 2 | roll mill | 0.3 | residue-on-sieve | 30 | 1.5 | 0.20 |
| Example 3 | impact dryer mill | 0.2 | residue-on-sieve | 20 | 1.9 | 0.25 |
| Example 4 | turbo mill | 0.6 | residue-on-sieve and sieve-passing fraction | 50 | 1.8 | — |
| Example 5 | roll mill | 0.7 | residue-on-sieve | 50 | 1.8 | — |
| Example 6 | turbo mill | 0.8 | residue-on-sieve | 55 | 1.5 | 0.20 |
| Example 7 | impact dryer mill | 0.4 | residue-on-sieve | 55 | 1.8 | 0.15 |
| Example 8 | impact dryer mill | 0.1 | residue-on-sieve and sieve-passing fraction | 20 | 1.8 | 0.15 |
| Comp. Ex. 1 | impact dryer mill | 0.1 | residue-on-sieve | 0 | 1.8 | 0.15 |

*1 The content of the particles having smaller particle sizes than opening of the sieve in the pulverized product which will be re-pulverized.

TABLE 2

| | physical properties of porous water-soluble nonionic cellulose ether | | | | | | | |
|---|---|---|---|---|---|---|---|---|
| | average pore diameter (μm) | average particle size (μm) | particle size | | | loose apparent density (g/ml) | viscosity of 2 wt % aq. solution (mPa·s) | dissolution time (seconds) |
| | | | <15 μm (wt %) | <10 μm (wt %) | <5 μm (wt %) | | | |
| Example 1 | 30 | 60 | 6 | 2 | 1 | 0.25 | 4000 | 120 |
| Example 2 | 32 | 70 | 5 | 2 | 1 | 0.24 | 100000 | 130 |
| Example 3 | 35 | 62 | 6 | 2 | 1 | 0.33 | 8000 | 150 |
| Example 4 | 28 | 55 | 6 | 2 | 2 | 0.26 | 8000 | 119 |
| Example 5 | 27 | 50 | 7 | 3 | 2 | 0.26 | 30000 | 115 |

TABLE 2-continued

| | physical properties of porous water-soluble nonionic cellulose ether | | | | | | |
|---|---|---|---|---|---|---|---|
| | average pore diameter (μm) | average particle size (μm) | particle size | | | loose apparent density (g/ml) | viscosity of 2 wt % aq. solution (mPa·s) | dissolution time (seconds) |
| | | | <15 μm (wt %) | <10 μm (wt %) | <5 μm (wt %) | | | |
| Example 6 | 30 | 40 | 8 | 3 | 2 | 0.35 | 100000 | 122 |
| Example 7 | 30 | 35 | 9 | 4 | 3 | 0.35 | 100000 | 140 |
| Example 8 | 36 | 37 | 9 | 4 | 3 | 0.35 | 100000 | 153 |
| Comp. Ex. 1 | 38 | 40 | 8 | 3 | 2 | 0.35 | 100000 | 170 |

The invention claimed is:

1. A porous water-soluble nonionic cellulose ether having an average pore size of 36 μm or smaller and an average particle size of from 30 to 300 μm.

2. The porous water-soluble nonionic cellulose ether according to claim 1, comprising 5% by weight or more of particles having particle sizes smaller than 15 μm, 2% by weight or more of particles having particle sizes smaller than 10 μm, and 1% by weight or more of particles having particle sizes smaller than 5 μm.

3. The porous water-soluble nonionic cellulose ether according to claim 1, having a loose apparent density of from 0.20 to 0.50 g/ml.

* * * * *